United States Patent Office 2,759,960
Patented Aug. 21, 1956

2,759,960
PROCESSES FOR THE MANUFACTURE OF ORGANOSILICON HALIDES

Kunio Nishikawa, Isao Shiihara and Ryo Shimamoto, Kyoto, Japan

No Drawing. Application April 7, 1951, Serial No. 219,898

Claims priority, application Japan April 15, 1950

16 Claims. (Cl. 260—448.2)

The present invention relates to processes for the manufacture of organosilicon halides, particularly to processes in which a mixed gas of trichlorosilane and halogenohydrocarbon is introduced into a catalyser consisting of or comprising alumina under heating.

The general object of the present invention is to obtain organosilicon halides more easily and in higher yield than by the methods hitherto known.

More particularly the present invention relates to a process for preparing alkyl or aryl substituted halogenosilane which is characterised by treating a mixed gas of trichlorosilane and halogenohydrocarbons with alumina or with a catalyser comprising alumina at a temperature of 250–450° C. without the application of pressure, i. e., at substantially atmospheric pressure.

Processes for the manufacture of alkyl or aryl substituted chlorosilane in which halogenated hydrocarbon is reacted with silicon with or without a catalyser consisting of metals such as nickel, tin and the like or readily reducible metal oxide such as copper suboxide are known to public.

The catalyser employed in the present invention has an entirely different character from the known ones. It consists of or comprises alumina, as mentioned above, which accelerates the reaction between trichlorosilane and halogenohydrocarbon.

The alumina may be placed in a reaction vessel as separate layers in series.

In order to activate the reaction efficiently, the moisture in the catalysers, which can not be eliminated by means of mere drying process, is preferably eliminated with hydrogen chloride or halogenated hydrocarbon before beginning the main reaction.

Alumina has various catalytic actions such as alkylation and others but, among them, dehydrogenation and dehydrochlorination actions are particularly remarkable. Therefore, in forming alkyl or aryl substituted halogenosilane by the reaction between trichlorosilane and halogenohydrocarbon, alumina makes the reaction effective catalytically.

In addition, the catalyst is able to change a siliconhydrogen bond to a silicon-chlorine bond or to a siliconcarbon bond when alkyl- or aryl-hydrochlorosilane, or alkyl- or aryl-silane is reacted with hydrogen chloride or with halogenohydrocarbon. Alumina also catalyzes, when employed on monoalkyl- or dialkylchlorosilane together with alkyl or aryl halide, to change them to more highly alkyl or aryl substituted chlorosilane.

The reaction may be carried out in a gas phase with halogenohydrocarbon or hydrocarbon alone, but admixture of an adequate quantity of hydrogen or hydrogen chloride gas can improve the yield.

The reaction between trichlorosilane and a hydrocarbon on red-heated clay plates in a quartz tube at a temperature of 750–770° C. is already known. However, this method requires higher temperature by 300–500° C. than the present invention, and the fact that the yield is very poor shows that the product is formed in a pyrolysis as an accidental side reaction. The reaction mechanism is, therefore, entirely different from the catalytic reaction of the present invention.

As the catalytic actions of alumina or substances comprising it are remarkable, as mentioned above, especially in dehydrogenation and dehydrochlorination, the introduction of hydrocarbon radical to silicon can be carried out more effectively and the yield can be increased by using them in combination with other catalysers especially capable of introducing hydrocarbon radicals, such as copper, aluminium, iron, zinc or the like alone, or their mixture or a mixture of these metals with silicon. Therefore, when the catalyser which has the best selected combination for the purpose of the catalytic reaction is used, the utilization hydrocarbon radical becomes far higher than by known processes.

Several practical examples of this improved process are described in the following but it will be understood that the present invention is not limited by these examples.

*Example 1*

Alumina catalyser to be used in this invention is obtained by the following method. Aluminium hydroxide precipitated by adding an equivalent quantity of sulphuric acid to a solution of sodium aluminate is thoroughly washed until sulphate ion is eliminated and then dehydrated to aluminium oxide in an oven. 500 g. of alumina thus obtained is granulated to a diameter of 5–6 mm. and packed in a reaction tube having an inside diameter of 3 cm. and a length of 100 cm. The moisture in the alumina is to a large extent eliminated at first by introducing hydrogen gas into the said alumina at 250° C. and further by introducing hydrogen chloride.

A mixed gas of 187 g. (1.38 mol.) of trichlorosilane and 58.5 g. (1.17 mol.) of methyl chloride is then introduced into the reaction tube heated at about 290° C. in the course of four hours at a constant rate, and then 182 g. of a condensation product (specific gravity 1.39) are obtained. Rectifying the condensate with a Podbielniak type precision distillation column having 30 theoretical plates, 9.5 g. of unchanged trichlorosilane (B. P. 31–37° C.), 126 g. of silicon tetrachloride (B. P. 50–59° C.) and 47.5 g. of methyltrichlorosilane (B. P. 65–67° C.) are obtained.

According to this result, the utility of the methyl radical in methyltrichlorosilane based on methyl chloride is 27%, and the yield of methylchlorosilane is, based on consumed trichlorosilane, 24.2%. It is found, therefore, that trichlorosilane is methylated with methyl chloride by catalytic action of alumina alone.

*Example 2*

By introducing a mixed gas of 186 g. (1.37 mol.) of trichlorosilane and 83 g. (1.27 mol.) of ethyl chloride into the same reaction tube containing the same catalyser as in Example 1 at a temperature of about 300° C. in course of three and a half hours at a uniform rate, 202 g. of condensate (specific gravity 1.38) are obtained. Rectifying the condensate, 17.3 g. of unchanged trichlorosilane, 81.5 g. of silicon tetrachloride and 21.6 g. of ethyltrichlorosilane (B. P. 90–97° C.) are obtained. According to this result, the ethyl radical utility of ethyltrichlorosilane calculated from ethyl chloride is 10.7%.

*Example 3*

By introducing a mixed gas of 40 g. (0.8 mol.) of methyl chloride and 0.8 moles of hydrogen and 135 g. (1.0 mol.) of trichlorosilane into the reaction tube containing the same catalyser as in Example 1 at a temperature of 275° C., 132 g. of condensate (specific gravity 1.40) are obtained. By rectification, 6.3 g. of unchanged trichlorosilane, 87.8 g. of silicon tetrachloride, 7.8 g. of methyldichlorosilane and 30.2 g. of methyltrichlorosilane are obtained. According to this result, the methyl radical utility of methyltrichlorosilane and methyldichlorosilane based on methylchloride is 32.7%. It is found, thereby, that the methyl radical utility is increased by means of the admixture of hydrogen.

*Example 4*

By introducing a mixed gas of 135 g. (1.0 mol.) of trichlorosilane and 26.5 g. (0.53 mol.) of methyl chloride at a temperature of 300° C. into a reaction tube wherein the first half is filled with alumina as in Example 3, and the other half is filled with 575 g. of catalyser of copper-silicon (80:20), there are obtained 98 g. of condensate (specific gravity 1.38). By rectification, unchanged trichlorosilane is not detected and 55.4 g. of silicon tetrachloride and 42.8 g. of methyl tricholorsilane are obtained. According to this result, the methyl radical utility of methyl chloride to methyltrichlorosilane is 53.6%, and it is found, thereby, that the combined use of the copper-silicon catalyser with alumina increases remarkably the degree of alkylation.

*Example 5*

By introducing a mixed gas of 135 g. (1.0 mol.) of trichlorosilane and 115 g. (1.0 mol.) of monochlorobenzene into the same catalyser as in Example 4 at a temperature of 350° C., 183 g. of condensate (specific gravity 1.24) are obtained. By rectification of the condensate, unchanged trichlorosilane is not detected and 44 g. of silicon tetrachloride, 44 g. of unchanged monochlorobenzene, 7 g. of fraction of B. P. 109° C, and 7 g. of phenyltrichlorosilane fraction of B. P. 195–205° C. are obtained.

Having now particularly described our invention, what we claim is:

1. Process for the manufacture of organosilicon halides, which comprises reacting a gaseous mixture of trichlorosilane and a member of the group consisiting of alkyl halides and aryl halides at a temperature of about 250–400° C., at substantially atmospheric pressure, in the presence of a member of the group consisting of (1) alumina and (2) alumina and a copper-silicon mixture.

2. Process according to claim 1, wherein the gaseous mixture includes hydrogen gas.

3. Process according to claim 1, wherein the reaction takes place at a temperature of about 275–350° C.

4. Process according to claim 1, wherein the halide is an alkyl halide.

5. Process according to claim 1, wherein the halide is a lower alkyl chloride.

6. Process according to claim 1, wherein the halide is methyl chloride.

7. Process according to claim 1, wherein the halide is ethyl chloride.

8. Process according to claim 1, wherein the reaction is conducted in the presence of dehydrated precipitated aluminum hydroxide.

9. Process according to claim 1, wherein the reaction is conducted in the presence of alumina and of a copper-silicon mixture.

10. Process according to claim 1, wherein the halide is a lower alkyl chloride and is reacted in the presence of alumina and of a copper-silicon mixture.

11. Process according to claim 1, wherein the halide is methyl chloride and is reacted in the presence of alumina and of a copper-silicon mixture.

12. Process according to claim 1, wherein the halide is ethyl chloride and is reacted in the presence of alumina and of a copper-silicon mixture.

13. Process for the manufacture of organosilicon halides, which comprises reacting a gaseous mixture of trichlorosilane and an aryl halide at a temperature of about 250–400° C., at substantially atmospheric pressure, and in the presence of alumina and of a copper-silicon mixture.

14. Process according to claim 13, wherein the alumina is dehydrated precipitated aluminum hydroxide.

15. Process according to claim 13, wherein the halide is a phenyl halide.

16. Process according to claim 13, wherein the halide is chlorbenzene.

References Cited in the file of this patent

UNITED STATES PATENTS

| | | |
|---|---|---|
| 2,379,821 | Miller et al. | July 3, 1945 |
| 2,380,999 | Sprung | Aug. 7, 1945 |
| 2,483,373 | Rochow | Sept. 27, 1949 |
| 2,511,820 | Barry et al. | June 13, 1950 |
| 2,598,436 | Mohler | May 27, 1952 |
| 2,626,269 | Barry | Jan. 20, 1953 |